United States Patent [19]

Speakes et al.

[11] Patent Number: 5,747,721
[45] Date of Patent: May 5, 1998

[54] BALLISTIC SHIELD

[75] Inventors: Dale M. Speakes, Auburn; Dee Raymond Cole, Seattle, both of Wash.

[73] Assignee: Creative Aeronautical Accessories, Inc., Bellevue, Wash.

[21] Appl. No.: 806,241

[22] Filed: Feb. 20, 1997

[51] Int. Cl.[6] ..................................... B64D 7/00
[52] U.S. Cl. .................. 89/36.11; 89/36.02; 244/121
[58] Field of Search ................ 89/36.11, 36.02, 89/37.16, 37.18, 37.19; 244/121, 173

[56] References Cited

U.S. PATENT DOCUMENTS

| | | | |
|---|---|---|---|
| 3,924,038 | 12/1975 | McArdle et al. | 109/49.5 |
| 4,352,851 | 10/1982 | Heitz et al. | 428/250 |
| 4,439,968 | 4/1984 | Dunn | 244/158 A |
| 5,542,626 | 8/1996 | Beuck et al. | 244/121 |
| 5,560,569 | 10/1996 | Schmidt | 244/117 R |

FOREIGN PATENT DOCUMENTS

| | | | |
|---|---|---|---|
| 475429 | 5/1915 | France | 89/36.11 |
| 598995 | 12/1925 | France | 244/121 |
| 825611 | 3/1938 | France | 244/121 |
| 406486 | 11/1924 | Germany | 244/121 |
| 237100 | 2/1990 | Japan | 244/121 |
| 435843 | 9/1935 | United Kingdom | 89/36.11 |
| 555700 | 9/1943 | United Kingdom | 244/121 |

*Primary Examiner*—Stephen M. Johnson
*Attorney, Agent, or Firm*—Seed and Berry LLP

[57] ABSTRACT

A ballistic shield (10) for mounting to an aircraft fuselage (14) is formed of lightweight, composite material and shaped to conform to the shape of the fuselage belly that when mounted creates a space (30) between the shield (10) and the belly (14) to enable energy-absorbing deflection of the shield (10). Compartments (36) formed in the shield midsection (24) receive removable inserts (44) that can be constructed of different ballistic-resistant materials to enable field modification of the shield (10) to meet a perceived threat level.

2 Claims, 3 Drawing Sheets

1
BALLISTIC SHIELD

TECHNICAL FIELD

The present invention pertains to shields for preventing ballistic damage to aircraft, and, more particularly, to a field-modifiable external ballistic shield that protects the aircraft's cockpit area and surrounding fuselage, as well as cockpit equipment, flight crew, and passengers.

BACKGROUND

It is well known that aircraft provide a substantial tactical advantage for observing, pursuing, and destroying targets. In civilian applications, aircraft, and in particular rotary wing aircraft, have been used with great success in reducing crime and apprehending criminals. However, the use of aircraft in both civilian and military applications is not without a certain element of danger and threat of damage and destruction to the aircraft, and injury or death to the flight crew and those on the ground.

In particular, it has been observed that civilian use of helicopters for law enforcement has resulted in direct attacks on the aircraft itself. Reports from many major cities in the United States note an increasing amount of law enforcement helicopters being shot during use. In cases where an aircraft has received a round of ammunition, there is at least some airframe damage. However, in all cases there is a very real life-threatening danger to the flight crew, passengers, and citizens on the ground.

Current ballistic protection provided to law enforcement helicopter crews is very limited. Typically, this protection takes the form of placing a ballistic vest (as currently worn by on-duty police officers) under the feet of crew members or under crew members' seats. This practice is a form of protection used during combat in the Vietnam theater of war.

Presently, ballistic protection for both the flight crew and a helicopter is unavailable. Protection of helicopter and other aircraft flight controls is just as vital as crew protection. While ballistic protection for the flight crew is good, it is useless if a pilot loses control of the aircraft due to ballistic damage. Furthermore, while the flight crew may survive an attack, it may not survive the crash that results from loss of flight authority.

The method of placing protective vests under personnel for protection while flying in an aircraft is limited to a small coverage area. This type of protection does nothing to shield the aircraft, including its flight controls. Ballistic damage to an aircraft will require its removal from service during the repair time. This "downtime" is costly in many ways, including the loss of the use of the aircraft, and the cost of the maintenance department to carry out the repair. Traditional armament used on land-based vehicles is too bulky and heavy for aircraft use.

There is not presently available ballistic protection for helicopters and light aircraft that meets the following requirements: (1) weight that is light enough to meet the lifting capabilities of the aircraft being used; (2) easy installation with little or no modification to the aircraft; and (3) field modifiable by the user to meet the requirements of the particular mission. Thus, there is a need for ballistic protection that extends to the flight crew as well as the aircraft structural components and flight controls. In addition, there is a need for a field modifiable or customer modifiable ballistic protection system that is light enough to be used on current aircraft, especially helicopters, that are used by law enforcement agencies.

2
SUMMARY OF THE INVENTION

The present invention is directed to a ballistic shield for aircraft comprising a body having one or more compartments, one or more removable ballistic-resistant or ballistic-capturing inserts sized and shaped to be slidably received within the compartments, and attaching members for removable mounting the body to an aircraft.

In accordance with another aspect of the present invention, an external ballistic shield for removable mounting on the exterior of an aircraft fuselage for protecting flight crews and cockpit flight controls is provided. The shield comprises a panel sized and shaped to shield at least the cockpit portion of the aircraft fuselage, the panel having one or more compartments. Ideally, the panel is shaped to conform to the shape of the shielded portion of the fuselage. One or more removable ballistic-resistant or ballistic-capturing inserts are provided. These inserts are sized and shaped to be slidably received within the compartments. Ideally, inserts of varying ballistic resistance, i.e., weight and size, are available for selective use in accordance with the mission needs or anticipated level of needed protection. Aircraft grade attachment devices, such as bolts, are used to removable mount the panel to existing attachment points on the aircraft in such a way as to create a void or space between the panel and the aircraft fuselage, thus enabling deflection of the panel during ballistic strikes.

In accordance with another aspect of the present invention, the body or panel is formed of a lightweight, hardened composite material that is flexible enough that upon ballistic impact, the material will locally flex or deflect to dissipate the ballistic energy and, ideally, capture the ballistic object.

In accordance with yet another aspect of the present invention, the body or panel comprises a shell having a first panel and a second panel held in spaced relationship by a plurality of wall members to form the one or more compartments.

In accordance with a further aspect of the present invention, the first and second panels and the wall members are integrally formed from a composite material.

In accordance with still yet another aspect of the present invention, the one or more removable inserts are formed from ballistic-resistant material that facilitates the capturing of ballistic objects.

As will be readily appreciated from the foregoing, the ballistic shield formed in accordance with the present invention meets all of the requirements previously outlined above, i.e., a light weight, easy installation, and field modifiable. While the body or panel alone provides minimal protection, a user may alter the level of protection to meet a desired level of safety by using removable inserts that are easily placed inside the compartments. The shield is easy to install, using only a minimal number of hand tools. Protection is then provided for the cockpit fuselage, the flight controls, as well as the flight crew.

BRIEF DESCRIPTION OF THE DRAWINGS

The foregoing and other features and advantages of the present invention will be more readily appreciated as the same becomes better understood from the following detailed description when taken in conjunction with the accompanying drawings, wherein.

DETAILED DESCRIPTION

Figure 1:
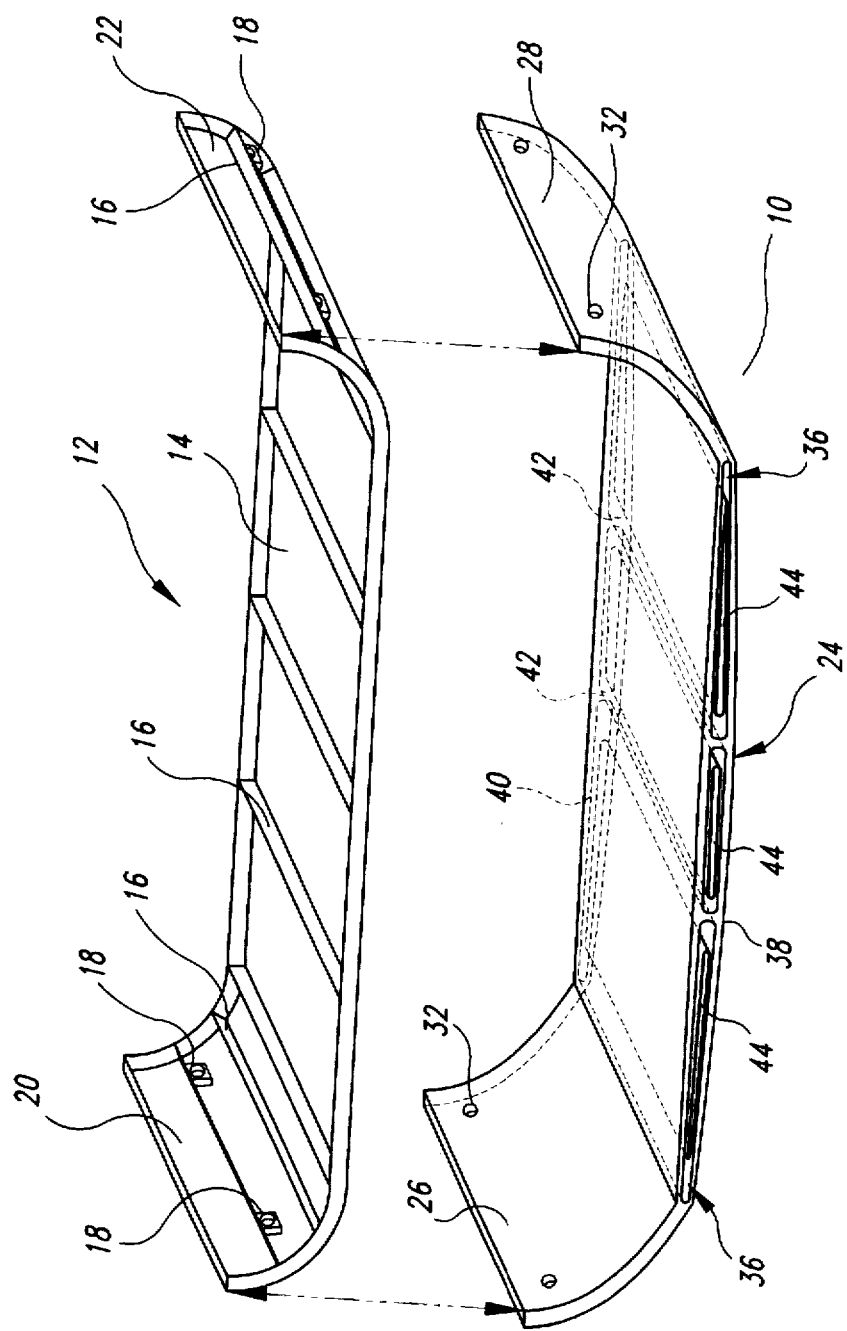
FIG. 1 is an isometric projection of a shield formed in accordance with the present invention in association with a portion of an aircraft fuselage.
Figure 2:
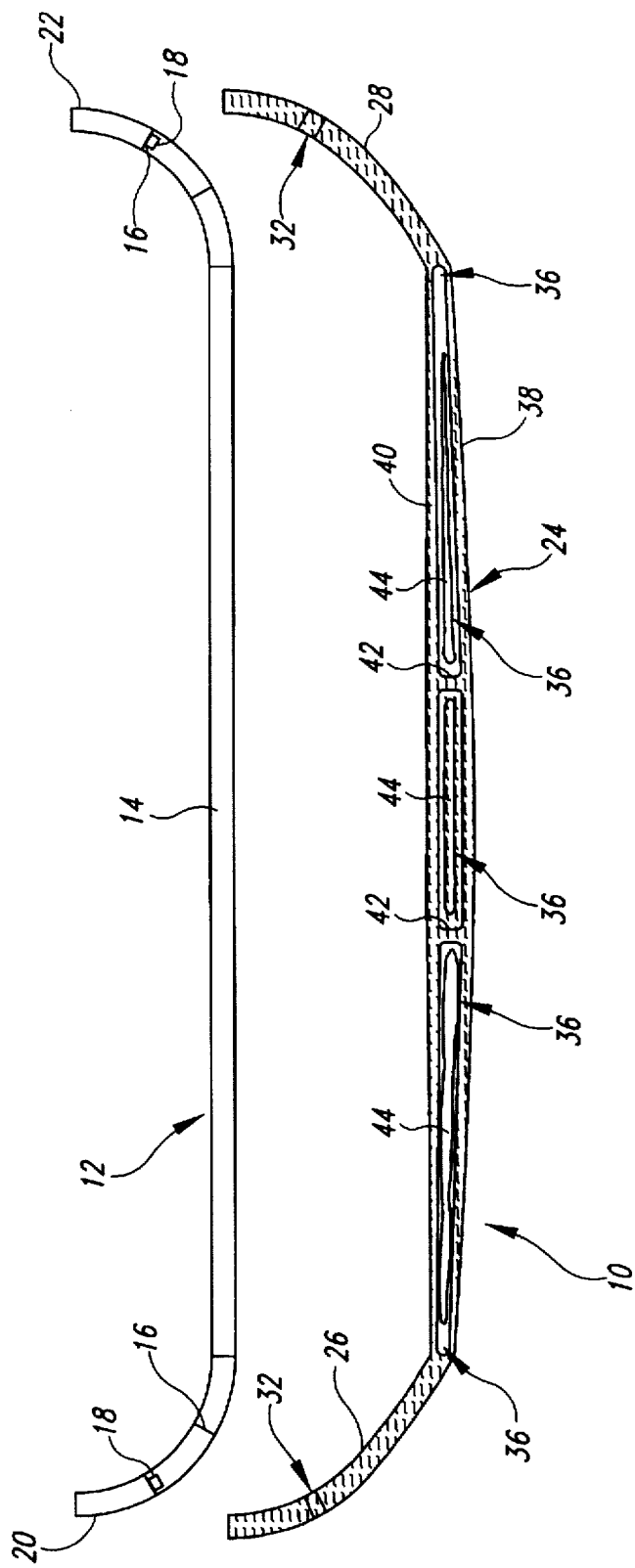
FIG. 2 is a cross-sectional view of the ballistic shield of FIG. 1 in association with a cross-sectional view of an aircraft fuselage floor structure.
Figure 3:
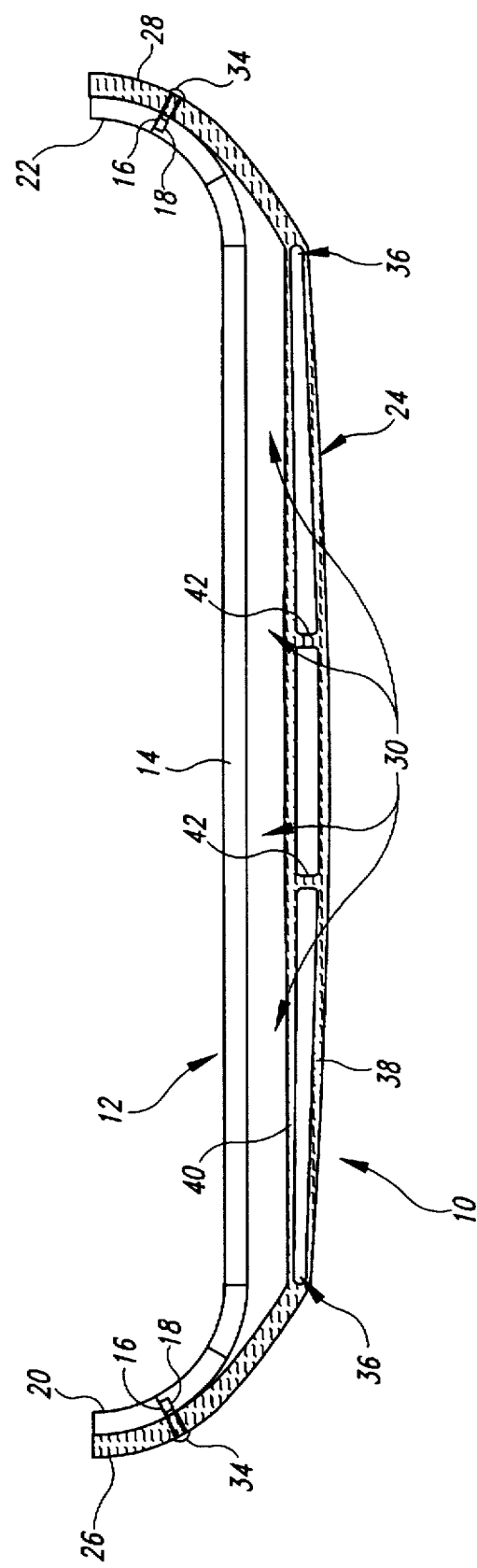
FIG. 3 is a cross-sectional view of the shield of FIGS. 1 and 2 shown in mating relationship with the aircraft fuselage floor structure.

Referring to FIGS. 1–3, illustrated therein is a ballistic shield 10 shown in association with an aircraft fuselage floor structure 12. The fuselage floor structure 12 is representative of both fixed and rotary wing aircraft, and it includes the fuselage 14 and representative structural framework 16 of a general nature. The structural framework 16 of most aircraft will include hard attachment points 18, which can be utilized for attaching external devices. These attachment points 18 typically consist of fastener receiving devices, such as threaded sleeves or inserts to hold threaded fasteners. In the absence of attachment points 18 in the original structural framework 16, one of ordinary skill can adapt the structural framework 16 to include hard attachment points 18 for purposes of the present invention.

The section of fuselage 12 shown in FIGS. 1–3 is a representative sample of a portion of the lower section or "belly" of an aircraft. The upturned sides 20 and 22 are representative of the port and starboard sides of an aircraft, such as a helicopter.

The ballistic shield 10 has a similar configuration to the aircraft fuselage 14 in that it has a substantially planar midsection 24 with upturned sides 26 and 28. The shield 10 is sized and shaped to match the shape of the aircraft fuselage 14, as shown more clearly in FIGS. 2 and 3. However, the length of the shield sides 26 and 28 is greater than the fuselage sides 20 and 22, and the radius of the shield sides 26 and 28 is slightly greater than the radius of the fuselage sides 20 and 22 such that when the shield 10 is attached to the fuselage 14, the midsection 24 of the shield is held in spaced parallel relationship to the fuselage 14. More particularly, as show in FIG. 3, a void or space 30 is created between the shield midsection 24 and the aircraft fuselage 14. This space 30 provides room for the shield 10 to deflect upon ballistic impact, thereby dissipating the energy of the ballistic object and facilitating capture of the ballistic object, without damaging the fuselage 14.

The shield sides 26 and 28 are ideally configured to curve upward to lie adjacent to the fuselage sides 20 and 22 as they approach the vertical plane. Openings 32 are formed in the shield sides 26 and 28 through which fasteners 34 pass and are received in the attachment points 18. Thus, the mounting of the shield 10 is accomplished by means of the fasteners 34 passing through the openings 32 in the upturned vertical sides 26 and 28 of the shield 10 to the attachment points 18 provided by the manufacturer. The fasteners 34 are thereby placed in a sheer load, this being the strongest method of securing.

Ideally, the shield 10 is constructed of multiple layers of Kevlar fabric. The fabric warp is placed in specific directions for each layer, which is known as the "lay-up schedule." The lay-up schedule is an engineered arrangement to provide ballistic capturing strength. In accordance with this schedule, 10 layers are used as described below.

The lay-up schedule requires each layer to have its warp positioned 45 degrees from the previous layer. Thermoplastic sheeting is placed between each layer of fabric. The total number of layers determines the ballistic capture strength of each shell. Panels that have been tested comprised 10 layers of fabric. Once the lay-up schedule is completed the assembly is placed in an autoclave, this condenses the assembly of materials and sets the thermoplastic to shape.

In accordance with a preferred embodiment of the present invention, the shield 10 can be constructed to have hollow areas or compartments 36 formed in the shield midsection 24. These compartments 36 are created by forming the shield midsection 24 from a lower or outside panel 38 and an upper or inside panel 40 that are held in spaced parallel relationship by vertical walls 42. This sandwich style of construction forms several layers of ballistic shielding.

In addition, inserts 44 may be used in conjunction with the shield 10 to match the level of ballistic protection to the perceived threat level. These inserts 44, shown in FIGS. 1 and 2, are slidably received within the compartments 36, ideally from the aft direction. The resulting total assembly forms a "triplex" of ballistic capturing material.

The ballistic inserts are secured via "pit pins" (these are high-strength shear pins, that are self securing). This allows the removal of the inserts to be done without the need for tools. The pins pass through the outer shell, the insert, and the inner shell by means of a common hole (approximate ¼ inch in diameter). A ball detent in the pin locks the pin in place.

These inserts 44 may be constructed of various proven ballistic materials, including (i) ballistic fabrics, as used in vests worn by police officers while on duty; (ii) hard plastics, such as the type used for "bullet-proof" windscreens on military aircraft; (iii) ceramic materials that are being increasingly found on land-based vehicles; and (iv) metal alloys. Thus, inserts 44 of varying levels of ballistic capturing strength can be selected for use in combination with the shield 10.

The body structure of the shield 10 is comprised of composite material. This material and the structural design of the shield 10 provide at least a minimal level of protection from ballistic threat. The compartments 36 and inserts 44 enable operator customization of the level of ballistic protection based on the perceived threat level.

The shield 10 is contour molded to follow the general shape of the aircraft fuselage 14, such as a helicopter belly pan. Attachment bolts or fasteners 34 are engaged with hard attachment points 18 in the aircraft for easy installation and full load security.

With the shield 10 so mounted, the void or space 30 between the shield 10 and the fuselage 14 allows for energy-absorbing deflection of the shield 10 during ballistic impact while preventing damage to the fuselage 14 from the deflecting shield 10.

Although a preferred embodiment of the invention has been illustrated and described herein, it is to be understood that various changes may be made therein without departing from the spirit and scope of the invention. Thus, the invention is to be limited only by the scope of the appended claims.

The embodiments of the invention in which an exclusive property or privilege is claims are defined as follows:

1. An external ballistic shield for removable mounting on the exterior of an aircraft fuselage for protecting cockpit equipment and occupants, comprising:

a shell sized and shaped to conform to and shield a portion of the aircraft fuselage, said shell having a top wall and a bottom wall and one or more side walls that form one or more compartments, each of said one or more compartments having an opening associated therewith to permit unobstructed access thereto;

one or more removable ballistic-resistant inserts sized and shaped to be slidably received within said one or more compartments;

means for releasably securing said inserts within said one or more compartments such that said inserts can be readily, manually inserted into and removed from said one or more compartments; and means for removable mounting of said shell to the lower sides of the aircraft fuselage such that a space of sufficient size is created between said shell and the aircraft fuselage to enable deflection of said shell upon ballistic impact without damaging the aircraft fuselage.

2. A ballistic shield for the fuselage of an aircraft, comprising:

a body sized and shaped for mounting on the exterior of the aircraft to protect at least a portion of the aircraft fuselage; said body being formed from a lightweight, hardened material that deflects upon ballistic impact to dissipate ballistic energy and capture ballistic objects said body comprising a first panel and a second panel, each of said panels having lateral side edges, said panels being held in spaced parallel relationship by one or more wall members to form one or more compartments therein each of said one or more compartments having an opening associated therewith to permit unobstructed access to said one or more compartments:

means for mounting said body on the exterior of the aircraft fuselage such that said body is positioned adjacent to the aircraft fuselage to form a space between said body and the aircraft fuselage whereby said body will not contact the aircraft fuselage as said body deflects upon ballistic impact, said mounting means including a mounting member mounted on each of said lateral side edges of said body, each of said mounting members configured to conform to the shape, of the lower sides of the aircraft fuselage and to be attached thereto;

one or more removable inserts formed from ballistic resistant material, each of said one or more removable inserts sized and shaped to be readily manually inserted within said one or more compartments: and means for releasably securing said one or more removable inserts in said one or more compartments.

* * * * *